United States Patent
Ma et al.

(10) Patent No.: US 12,277,016 B2
(45) Date of Patent: Apr. 15, 2025

(54) SYSTEM, METHOD, APPARATUS AND DEVICE FOR ADJUSTING POWER CONSUMPTION, AND MEDIUM

(71) Applicant: SUZHOU METABRAIN INTELLIGENT TECHNOLOGY CO., LTD., Jiangsu (CN)

(72) Inventors: Wenchao Ma, Jiangsu (CN); Ruidong Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,468

(22) PCT Filed: Jun. 28, 2022

(86) PCT No.: PCT/CN2022/102090
§ 371 (c)(1),
(2) Date: Jun. 26, 2024

(87) PCT Pub. No.: WO2023/197456
PCT Pub. Date: Oct. 19, 2023

(65) Prior Publication Data
US 2025/0060801 A1 Feb. 20, 2025

(30) Foreign Application Priority Data
Apr. 14, 2022 (CN) .......................... 202210387192.0

(51) Int. Cl.
G06F 1/00 (2006.01)
G06F 1/3206 (2019.01)
G06F 1/3296 (2019.01)

(52) U.S. Cl.
CPC .......... *G06F 1/3206* (2013.01); *G06F 1/3296* (2013.01)

(58) Field of Classification Search
None
See application file for complete search history.

(56) References Cited

U.S. PATENT DOCUMENTS

| 2015/0177814 A1* | 6/2015 | Bailey | G06F 1/3296 |
| | | | 713/320 |
| 2017/0147060 A1* | 5/2017 | Chen | G06F 1/263 |

(Continued)

FOREIGN PATENT DOCUMENTS

| CN | 107908583 A | 4/2018 |
| CN | 112667470 A | 4/2021 |

(Continued)

OTHER PUBLICATIONS

International Search Report and Written Opinion, dated 2022-11-29, Application No. PCT/CN2022/102090, 15 pgs.

(Continued)

*Primary Examiner* — Nitin C Patel
(74) *Attorney, Agent, or Firm* — Merchant & Gould P.C.

(57) ABSTRACT

A system, method, apparatus and device for adjusting power consumption, and a medium are provided. The system includes a Power Supply Unit (PSU) and a Complex Programmable Logic Device (CPLD). An input end of the PSU is connected to a server, and the PSU is configured to receive an initial electrical signal of the server in real time, and determine a current power supply condition according to the initial electrical signal to obtain a final electrical signal. The CPLD is connected to an output end of the PSU, and the CPLD is configured to receive the final electrical signal, increase a power of the server when the final electrical signal is a signal representing that the current power supply condition is high output power, and decrease the power of the server when the final electrical signal is a signal representing that the current power supply condition is low output power.

16 Claims, 5 Drawing Sheets

(56) References Cited

U.S. PATENT DOCUMENTS

2017/0168550 A1     6/2017   Lu
2020/0210304 A1*   7/2020   Wang .................. G06F 11/0706

FOREIGN PATENT DOCUMENTS

| CN | 113157076 A | 7/2021 |
| CN | 113589913 A | 11/2021 |
| CN | 113626297 A | 11/2021 |
| CN | 114461055 A | 5/2022 |

OTHER PUBLICATIONS

Chinese Search Report received for CN Application No. 2022103871920 on May 12, 2022, 2 pgs.
Chinese Search Report received for CN Application No. 2022103891920 on Jun. 15, 2022, 2 pgs.

* cited by examiner

SYSTEM, METHOD, APPARATUS AND DEVICE FOR ADJUSTING POWER CONSUMPTION, AND MEDIUM

CROSS-REFERENCE TO RELATED APPLICATION

The present application is a National Stage Application of PCT International Application No.: PCT/CN2022/102090 filed on Jun. 28, 2022, which claims priority to Chinese Patent Application 202210387192.0, filed in the China National Intellectual Property Administration on Apr. 14, 2022, the disclosure of which is incorporated herein by reference in its entirety.

TECHNICAL FIELD

The present disclosure relates to the technical field of server power consumption, and in particular, to a system, method, apparatus and device for adjusting power consumption, and a medium.

BACKGROUND

With the rapid development of Internet, the fifth Generation communication technology (5G) and other technologies, information resources have grown explosively, leading to emergence of various large-scale data centers. The number and power of servers, which are the main components of these data centers, are also growing rapidly. In recent years, the rapid development of servers has posed higher and higher requirements for the power supply of servers. At present, the power density of server power supplies has reached an extremely high level. However, the overall power consumption of servers continues to rise. Therefore, it has gradually become a focus of attention to reasonably adjust the power consumption of the server system based on the existing power supply design of the server to avoid system downtime.

There are currently two primary methods for regulating server power consumption. The first method involves triggering Central Processing Unit (CPU) throttling by a Power Supply Unit (PSU) Alert signal. When the PSU has faults such as over-temperature or over-current alerts, the PSU Alert signal is pulled down. Once detecting that the PSU Alert signal is pulled down, a Complex Programmable Logic Device (CPLD) triggers CPU throttling, and the CPU in the server will then operate at a lower frequency, thereby significantly reducing system power consumption. The first method may prevent the PSU from shutting down due to faults and prevent the server system from going down. However, due to the reduced power consumption, most functions of the server will be restricted, it may only be ensured that the server does not crash, but the server cannot perform other operations.

The second method involves triggering CPU frequency reduction by PSU power information. A Baseboard Management Controller (BMC) polls the power information of the PSU through Inter-Integrated Circuit (I2C) communication and adjusts the CPU power based on the ratio of the output power of the PSU to the rated power of the PSU. When the output power of the PSU is high, the BMC controls the CPU to reduce the frequency of the CPU; when the output power of the PSU is low, the BMC controls the CPU to increase the frequency of the CPU. However, as the BMC performs polling at intervals, there is a discrepancy between the power consumption of the CPU and the power consumption of the PSU. This may lead to frequency oscillation of the CPU and power oscillation of the PSU, and even the possibility of the PSU being over-powered due to a long polling time interval, causing the server system to crash.

In view of the above problems, how to reduce server power consumption while ensuring the normal functioning of server features and avoiding CPU frequency fluctuations and PSU power fluctuations caused by BMC polling at time intervals is a problem that those having ordinary skill in the art are striving to solve.

SUMMARY

The embodiments of the present disclosure provide a system for adjusting power consumption, including a PSU and a CPLD;
  an input end of the PSU is connected to a server, and the PSU is configured to receive an initial electrical signal of the server in real time, and determine a current power supply condition according to the initial electrical signal to obtain a final electrical signal; and
  the CPLD is connected to an output end of the PSU, and the CPLD is configured to receive the final electrical signal, increase a power of the server when the final electrical signal is a signal representing that the current power supply condition is high output power, and the power of the server is decreased when the final electrical signal is a signal representing that the current power supply condition is low output power.

In some exemplary embodiments, the PSU includes a sampling module, an average current output module and a signal control module;
  an input end of the sampling module serves as the input end of the PSU and is connected to the server, and the sampling module is configured to acquire the initial electrical signal and a present current signal;
  an input end of the average current output module is connected to an output end of the sampling module, and the average current output module is configured to receive the initial electrical signal of the server and output an average current signal according to the initial electrical signal and the present current signal; and
  an input end of the signal control module is connected to an output end of the average current output module, and the signal control module is configured to determine the current power supply condition according to the average current signal, so as to obtain the final electrical signal; and an output end of the signal control module serves as the output end of the PSU and is connected to the CPLD.

In some exemplary embodiments, the average current output module includes a first amplifier and a first diode;
  a non-inverting input end of the first amplifier serves as the input end of the PSU, an inverting input end of the first amplifier is grounded, an output end of the first amplifier is connected to an anode of the first diode, and a cathode of the first diode serves as the output end of the average current output module.

In some exemplary embodiments, the sampling module includes a first resistor and a second resistor;
  a common end formed by a first end of the first resistor and a first end of the second resistor serves as the input end of the sampling module, the first end of the first resistor is connected to the first end of the second resistor, a second end of the second resistor is grounded, and a second end of the first resistor serves as the output end of the sampling module.

In some exemplary embodiments, the signal control module includes an adder, a second amplifier, a second diode and a triode;
wherein the adder includes a third resistor, a fourth resistor, a fifth resistor, a sixth resistor and a seventh resistor;
a first end of the third resistor serves as a first input end of the signal control module, and a first end of the fourth resistor serves as a second input end of the signal control module; and
a common end formed by a second end of the third resistor, a second end of the fourth resistor and a first end of the fifth resistor is connected to a negative power supply end of the second amplifier; a second end of the fifth resistor is grounded; a common end formed by a first end of the sixth resistor and a first end of the seventh resistor is connected to a positive power supply end of the second amplifier; a second end of the seventh resistor is grounded; a second end of the sixth resistor is connected to an output end of the second amplifier; an output end of the second amplifier is connected to an anode of the second diode; a cathode of the second diode is connected to a collector of the triode; a base of the triode serves as a receiving end for receiving a pull-up level signal; an emitter of the triode is grounded; and a common end formed by the cathode of the second diode and the collector of the triode serves as the output end of the signal control module.

In some exemplary embodiments, the system further includes a frequency modulation component;
the frequency modulation component is connected to the CPLD and is configured to adjust the power of the server.

The embodiments of the present disclosure further provide a method for adjusting power consumption, the method being performed by a PSU and including:
receiving an initial electrical signal from a server in real time;
determining a current power supply condition according to the initial electrical signal to obtain a final electrical signal, so that based on the final electrical signal, the power of the server is increased when the final electrical signal is a signal representing that the current power supply condition is high output power, and the power of the server is decreased when the final electrical signal is a signal representing that the current power supply condition is low output power.

The embodiments of the present disclosure further provide a method for adjusting power consumption, the method being performed by a CPLD and including:
receiving a final electrical signal, wherein the final electrical signal is obtained by converting an initial electrical signal received by a server in real time; and
adjusting a power of the server according to the final electrical signal, so that the power of the server is increased when the final electrical signal is a signal representing that a current power supply condition is high output power, and the power of the server is decreased when the final electrical signal is a signal representing that the current power supply condition is low output power.

The embodiments of the present disclosure further provide an apparatus for adjusting power consumption, the apparatus being provided in a PSU and includes:

a first receiving module, configured to receive an initial electrical signal from a server in real time;
a determination module, configured to determine a current power supply condition according to the initial electrical signal to obtain a final electrical signal, so that based on the final electrical signal, the power of the server is increased when the final electrical signal is a signal representing that the current power supply condition is high output power, and the power of the server is decreased when the final electrical signal is a signal representing that the current power supply condition is low output power.

The embodiments of the present disclosure further provide an apparatus for adjusting power consumption, the apparatus being provided in a CPLD and includes:
a second receiving module, configured to receive a final electrical signal, wherein the final electrical signal is obtained by converting an initial electrical signal received by a server in real time; and
an adjustment module, configured to adjust the power of the server according to the final electrical signal, so that the power of the server is increased when the final electrical signal is a signal representing that the current power supply condition is high output power, and the power of the server is decreased when the final electrical signal is a signal representing that the current power supply condition is low output power.

The embodiments of the present disclosure further provide a device for adjusting power consumption, including a memory and one or more processors, wherein the memory stores computer readable instructions, wherein the computer readable instructions, when executed by the one or more processors, cause the one or more processors to execute the above method for adjusting power consumption.

The embodiments of the present disclosure further provide a non-transitory computer-readable storage medium storing one or more computer-readable instructions, and the computer-readable instructions, when executed by one or more processors, cause one or more processors to execute the operations of the above method for adjusting power consumption.

BRIEF DESCRIPTION OF THE DRAWINGS

To describe the embodiments of present disclosure more clearly, the following briefly describes the accompanying drawings required for describing the embodiments. Apparently, the accompanying drawings in the following description show merely some embodiments of the present disclosure, and a person having ordinary skill in the art may derive other embodiments from these accompanying drawings without creative efforts.

10 represents a PSU, 11 represents a CPLD, 101 represents a sampling module, 102 represents an average current output module, 103 represents a signal control module, and 20 represents a frequency modulation component.

DETAILED DESCRIPTION OF THE EMBODIMENTS

Hereinafter, the technical solutions in the embodiments of the present disclosure will be described clearly and thoroughly with reference to the accompanying drawings of the embodiments of the present disclosure. Obviously, the embodiments as described are only some of the embodiments of the present disclosure, and are not all of the embodiments of the present disclosure. All other embodiments obtained by those having ordinary skill in the art based on the embodiments in the application without creative work shall fall within the scope of protection of the application.

The embodiments of the present disclosure provide a system, method, apparatus and device for adjusting power consumption, and a medium, which may enable functions in the server to work normally and avoid CPU frequency oscillation and PSU power oscillation when a BMC performs polling at intervals.

To make a person having ordinary skill in the art better understand the solutions of the present disclosure, the present disclosure is further described in detail with reference to the accompanying drawings and exemplary embodiments.

Figure 1:
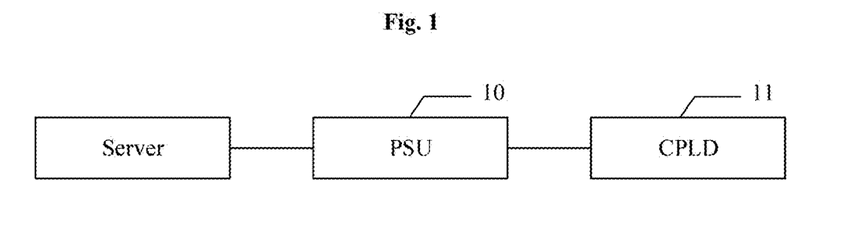
FIG. 1 is a structural diagram of a first system for adjusting power consumption according to one or more embodiments of the present disclosure.

FIG. 1 is a structural diagram of a first system for adjusting power consumption according to one or more embodiments of the present disclosure. As shown in FIG. 1, the system for adjusting power consumption includes a PSU 10 and a CPLD 11.

an input end of the PSU 10 is connected to a server, and the PSU 10 is configured to receive an initial electrical signal of the server in real time, and determine a current power supply condition according to the initial electrical signal to obtain a final electrical signal; and the CPLD 11 is connected to an output end of the PSU 10, and the CPLD 11 is configured to receive the final electrical signal, increase a power of the server when the final electrical signal is a signal representing that the current power supply condition is high output power, and the power of the server is decreased when the final electrical signal is a signal representing that the current power supply condition is low output power.

In the present embodiment, it should be noted that there is no requirement for the number of the PSUs 10. As an example only, there may be two PSUs 10. When there are two PSUs 10, the initial electrical signals generated by the two PSUs 10 may be acquired. It may be understood that each PSU 10 may produce an initial electrical signal. When the entire apparatus includes multiple PSUs 10, the multiple PSUs 10 are interconnected by means of initial electrical signals. It should be noted that, in the present embodiment, the initial electrical signal mentioned is a current signal which is obtained by converting a voltage signal of the server.

In the present embodiment, the CPLD adjusts the server power according to the received final electrical signal, thereby avoiding the case that in a low-frequency state, the functions of the server are restricted. Moreover, the problems of CPU frequency oscillation and PSU frequency oscillation caused by a time interval at which a BMC polls the PSU are solved.

Figure 2:
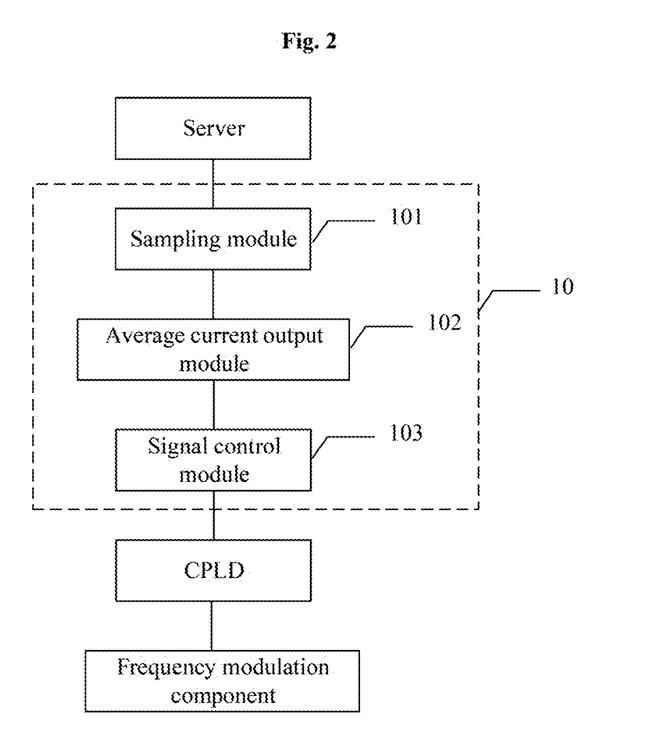
FIG. 2 is a structural diagram of a second system for adjusting power consumption according to one or more embodiments of the present disclosure.

FIG. 2 is a structural diagram of a second system for adjusting power consumption according to one or more embodiments of the present disclosure. Based on the above embodiment, as an exemplary improved embodiment, as shown in FIG. 2, the PSU 10 includes a sampling module 101, an average current output module 102 and a signal control module 103.

An input end of the sampling module 101 serves as the input end of the PSU 10 and is connected to the server, and the sampling module 101 is configured to acquire the initial electrical signal and a present current signal. An input end of the average current output module 102 is connected to an output end of the sampling module 101, and the average current output module 102 is configured to receive the initial electrical signal of the server and output an average current signal according to the initial electrical signal and the present current signal. An input end of the signal control module 103 is connected to an output end of the average current output module 102, and the signal control module 103 is configured to determine the current power supply condition according to the average current signal, so as to obtain the final electrical signal. An output end of the signal control module 103 serves as the output end of the PSU 10 and is connected to the CPLD 11.

It should be noted that, in the present embodiment, the sampling module 101, the average current output module 102 and the signal control module 103 are provided inside the PSU 10. However, it does not mean that externally connected components capable of achieving the same functions as the internal sampling module 101, the average current output module 102 and the signal control module 103 in the PSU 10 cannot be applied to the system for adjusting power consumption. As long as the same functions may be implemented, the modules provided inside the PSU 10 or the components externally connected to the PSU 10 may be set according to practical implementation scenarios.

As the initial electrical signal mentioned in the foregoing embodiment is a current signal, the initial electrical signal may also be referred to as an initial current signal. In addition, the average current output module 102 needs to determine whether the present current signal is the same as the initial current signal; when the present current signal is inconsistent with the initial current signal, an average value of the present current signal and the initial current signal is determined to obtain an average current signal. The average current signal is converted into a corresponding average voltage signal according to a certain conversion relationship. The present current signal is a current signal generated by the PSU 10. The signal control module 103 is further configured to superimpose the average voltage signal and a pull-up voltage signal to obtain a final voltage signal, and transmit the final voltage signal to the CPLD 11, so that the CPLD 11 may adjust power, and the pull-up voltage signal is a voltage signal generated by the PSU 10.

In some exemplary implementations, when the present current signal is different from the initial current signal, an average value of the present current signal and the initial current signal needs to be calculated to obtain an average current signal, and the average current signal is transmitted to the adder to obtain an average voltage signal; and when the present current signal is the same as the initial current signal, the initial current signal needs to be transmitted to the signal control module 103 as an average current signal to obtain an average voltage signal. It should also be noted that the default pull-up level of the pull-up voltage signal mentioned in the present embodiment in the whole apparatus is 2V.

It should be noted that there is a certain conversion relationship between the current signal and the voltage signal, and the conversion relationship may be set according to user requirements. The conversion relationship from the current signal to the voltage signal is not limited in the present embodiment.

The initial current signal in the server is sampled by the sampling module 101, and the obtained initial current signal is transmitted to the average current output module 102. In the whole apparatus for adjusting power consumption, the PSU 10 itself also generates a current, the current is the present current signal. In order to reduce errors, both the present current signal and the initial current signal are transmitted to the average current output module 102, and after the average current signal is calculated, the signal is converted into a corresponding average voltage signal. After the average voltage signal is obtained, the signal is transmitted to the signal control module 103, and the signal control module 103 superimposes the average voltage signal and the voltage signal inside the PSU 10 to obtain a final voltage signal. The final voltage signal is transmitted to the CPLD 11. In this way, the final voltage signal is acquired in real time without adding a PSU interface, and subsequent adjustment is performed by using a CPLD, thereby avoiding CPU frequency oscillation and PSU frequency oscillation caused by a time interval at which a BMC polls the PSU, and the case that in a low-frequency state, the functions of the server are restricted.

Based on the foregoing embodiment, as an exemplary improved embodiment, the system for adjusting power consumption further includes a frequency modulation component 20. The frequency modulation component 20 is connected to the CPLD 11 and is configured to adjust the power of the server. The frequency modulation component 20 mentioned in the present embodiment may be classified into two types: direct frequency modulation and indirect frequency modulation. Direct frequency modulation directly controls the circuit parameters or operation state of a self-excited oscillator by using a modulation signal, so that the oscillation frequency of the self-excited oscillator is modulated. It should be noted that, the frequency modulation component 20 mentioned in the present embodiment may be an RC multi-tune self-excited oscillator, a variable capacitance diode frequency-modulation oscillator, a reactance tube frequency-modulation oscillator, a relaxation frequency-modulation oscillator, or the like. Since the working principle of an RC multi-tune self-excited oscillator is simple, and a used component is a common component such as a resistor, a capacitor and an inductor, and the cost of the component is low, as an exemplary improved embodiment, the frequency modulation component 20 may be an RC multi-tune self-excited oscillator. In addition, it should be understood that, since the type and model of the frequency modulation component 20 may also be changed according to the scenarios in cases where the apparatus is used in different scenarios in actual production and life. The present embodiment does not limit the scenarios mentioned above, and allows a person having ordinary skill in the art to change the implementation thereof according to a practical implementation scenario.

Figure 3:
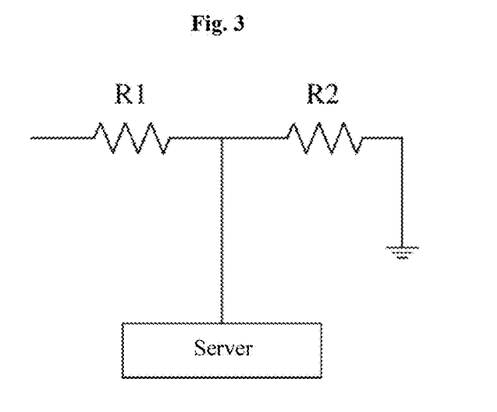
FIG. 3 is a circuit diagram of a sampling module according to one or more embodiments of the present disclosure.

FIG. 3 is a circuit diagram of a sampling module according to one or more embodiments of the present disclosure. Based on the above embodiment, as an exemplary improved embodiment, as shown in FIG. 3, the sampling module 101 includes a first resistor R1 and a second resistor R2. A common end formed by a first end of the first resistor R1 and a first end of the second resistor R2 serves as the input end of the sampling module 101, a first end of the first resistor R1 is connected to a first end of the second resistor R2, a second end of the second resistor R2 is grounded, and a second end of the first resistor R1 serves as the output end of the sampling module 101.

In the present embodiment, before the common end formed by the first end of the first resistor R1 and the first end of the second resistor R2 is used as the input end of the sampling module 101 to acquire the initial current signal, a voltage signal corresponding to the initial current signal should also be acquired, and the initial current signal obtained after the voltage signal is converted is obtained according to a formula of $U=I*R$ by means of the first resistor R1 and the second resistor R2.

It should be noted that, in the present embodiment, the first resistor R1 and the second resistor R2 have a function of voltage division, and the number, types, models, and resistance values of the resistors are not limited, as long as the sampling module 101 may realize the conversion of a voltage signal into an initial current signal that may be subsequently operated. The specific configuration of the sampling module 101 may be set according to practical implementation scenarios. Furthermore, the sampling module 101 may be an Analog-to-Digital (AD) sampling module 101 inside the PSU 10.

Figure 4:
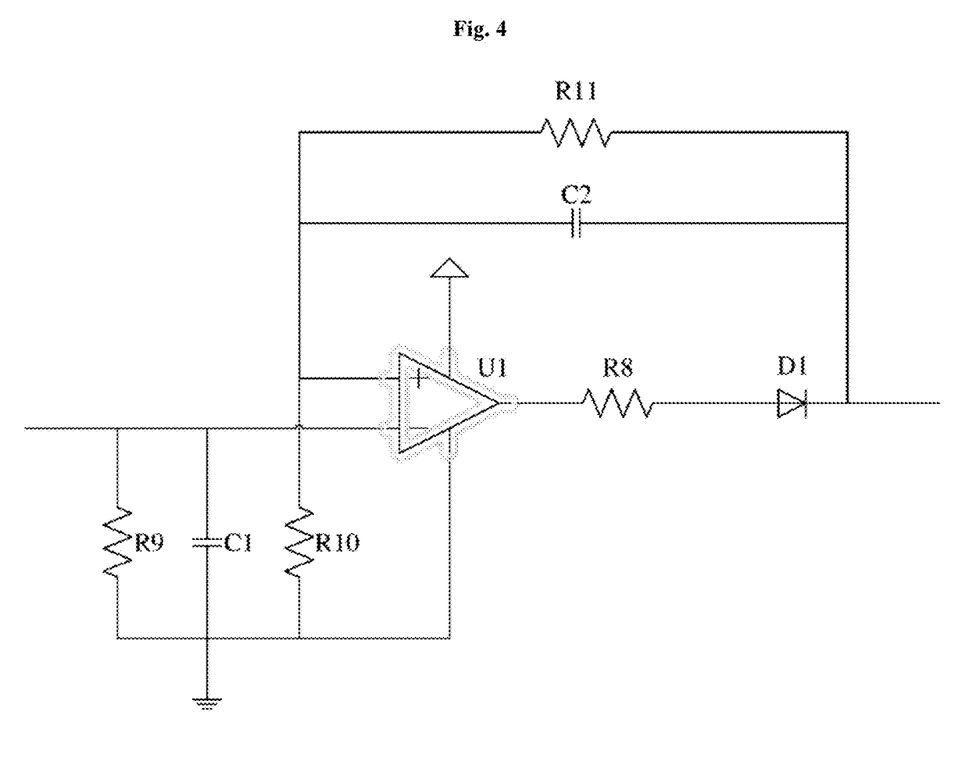
FIG. 4 is a circuit diagram of an average current output module according to one or more embodiments of the present disclosure.

FIG. 4 is a circuit diagram of an average current output module according to one or more embodiments of the present disclosure. Based on the above embodiment, as an exemplary improved embodiment, as shown in FIG. 4, the average current output module 102 includes a first amplifier U1 and a first diode D1.

A non-inverting input end of the first amplifier U1 serves as the input end of the PSU 10, an inverting input end of the first amplifier U1 is grounded, an output end of the first amplifier U1 is connected to an anode of the first diode D1, and a cathode of the first diode D1 serves as the output end of the average current output module 102.

In the foregoing embodiment, the present current signals of the one or more PSUs 10 are acquired, for example, the present current signals are acquired from the non-inverting input end of the first amplifier U1 which serves as the input end of the average current output module 102. The relationship between the present current signal and the initial current signal is judged in the average current output module 102. When the present current signal is different from the initial current signal, an average value of the present current signal and the initial current signal needs to be calculated to obtain an average current signal, and the average current signal is amplified by an amplification multiple of the first amplifier U1 to obtain an average voltage signal; when the present current signal is the same as the initial current signal, the initial current signal needs to be transmitted to the adder as an average current signal so as to obtain an average voltage signal.

In the present embodiment, the initial current signal is denoted as Iout1, the present current signal is denoted as Iout2, and the average current signal is denoted as Iout. The average current signal is calculated by the formula Iout=(Iout1+Iout2)/2. In addition, the average current output module 102 is further configured to convert an average current signal into a voltage signal 12LS of a corresponding proportion, and the voltage signal 12LS serves as the average voltage signal. The average current output module controls a PWM duty ratio generated by a register Peripheral Data Controller (PDC) inside the PSU 10 to adjust an output voltage. The PWM output signal is in a linear relationship with a current signal outputted by the entire apparatus, thereby ensuring data accuracy and consistency. It should be noted that, as an exemplary improved embodiment, the linear relationship between the PWM output signal and the current signal outputted by the entire apparatus is as follows: when the average current signal is 0 A, the corresponding average voltage signal 12LS is 0V, and the PWM value of the register PDC is 0; when the average current signal is 30 A, the corresponding average voltage signal 12LS is 0.6V, and the PWM value of the register PDC is 2000; when the average current signal is 60A, the corresponding average voltage signal 12 LS is 1.2V, and the PWM value of the register PDC is 4000. It should be noted that, in the present embodiment, the number, the types, the models, and the like of the first amplifiers U1 and the first diodes D1 are not limited, as long as the average current output module 102 may implement the foregoing judgment on the relationship between the present current signal and the initial current signal. The specific configuration of the average current output module 102 may be set according to a practical implementation scenario.

As shown in FIG. 4, the average current output module 102 further includes an eighth resistor R8.

A first end of the eighth resistor R8 is connected to the output end of the first amplifier U1, and a second end of the eighth resistor R8 is connected to the anode of the first diode D1. The eighth resistor R8 has a function of current limiting in the present embodiment, and is configured to prevent the damage to the first diode D1 when an excessive average current signal passes through the first diode D1. It should be noted that, in the present embodiment, the number, types, models, and resistance values of the eighth resistors R8 are not limited, as long as the eighth resistors R8 may achieve the effect of current limiting. The number of the eighth resistors R8 and the connection manner thereof may be determined according to a practical implementation scenario.

As shown in FIG. 4, the average current output module 102 further includes a ninth resistor R9, a tenth resistor R10, an eleventh resistor R11, a first capacitor C1 and a second capacitor C2.

A first end of the ninth resistor R9 is connected to the non-inverting input end of the first amplifier U1; a second end of the ninth resistor R9 is grounded; a first end of the tenth resistor R10 is connected to the inverting input end of the first amplifier U1; a second end of the tenth resistor R10 is grounded; a first end of the first capacitor C1 is connected to the non-inverting input end of the first amplifier U1; a second end of the first capacitor C1 is grounded; a first end of the eleventh resistor R11 is connected to the inverting input end of the first amplifier U1; a second end of the eleventh resistor R11 is connected to the cathode of the first diode D1; a first end of the second capacitor C2 is connected to the inverting input end of the first amplifier U1; and a second end of the second capacitor C2 is connected to the cathode of the first diode D1. It should be noted that the circuit structure composed of the ninth resistor R9 and the first capacitor C1 may achieve the filtering effect, preventing a PWM waveform generated by the register PDC inside the PSU 10 from reflecting the actual situation of the apparatus, and reducing errors. Likewise, the circuit structure composed of the tenth resistor R10 and the first capacitor C1 may also achieve the filtering effect, and achieve the above beneficial effect. The circuit structure composed of the eleventh resistor R11 and the second capacitor C2 may also achieve the filtering effect, and achieve the above beneficial effect. It should be noted that, in the present embodiment, the number, types, models, and values of the ninth resistor R9, the tenth resistor R10, the eleventh resistor R11, the first capacitor C1 and the second capacitor C2 are not limited, as long as the components may achieve the filtering effect according to the requirements of the implementation scenario. The number of the components and the connection manner thereof are determined according to the practical implementation scenario.

Figure 5:
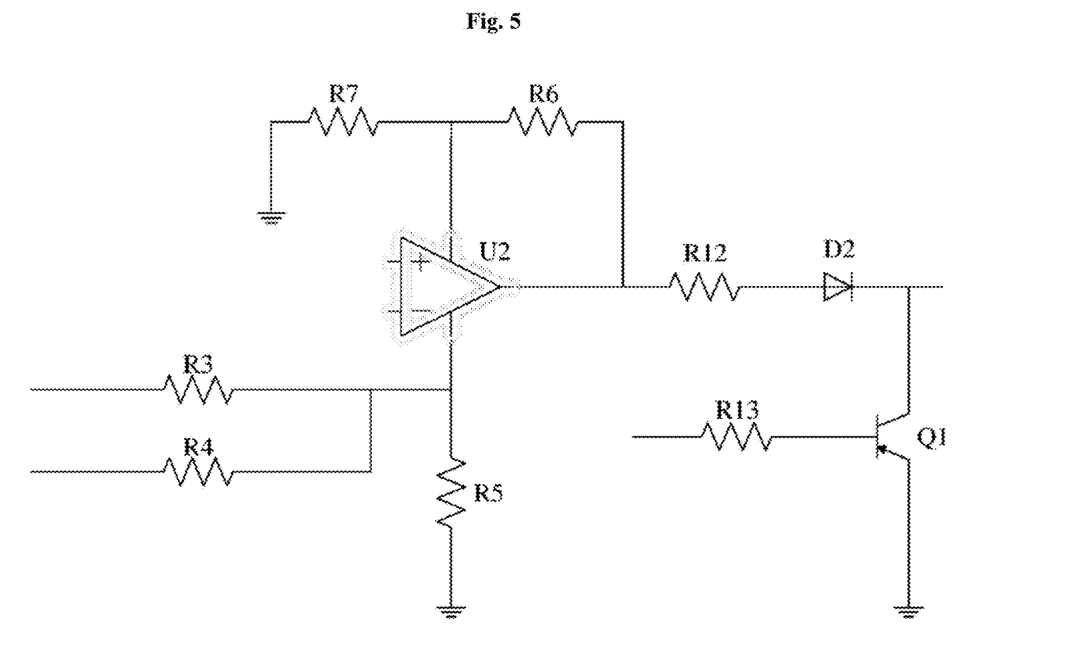
FIG. 5 is a circuit diagram of a signal control module according to one or more embodiments of the present disclosure.

FIG. 5 is a circuit diagram of a signal control module according to one or more embodiments of the present disclosure. Based on the foregoing embodiment, as an exemplary improved embodiment, as shown in FIG. 5, the signal control module 103 includes an adder, a second amplifier U2, a second diode D2, and a triode Q1. The adder includes a third resistor R3, a fourth resistor R4, a fifth resistor R5, a sixth resistor R6 and a seventh resistor R7.

A first end of the third resistor R3 serves as a first input end of the signal control module 103, and a first end of the fourth resistor R4 serves as a second input end of the signal control module 103;

a common end formed by a second end of the third resistor R3, a second end of the fourth resistor R4 and a first end of the fifth resistor R5 is connected to a negative power supply end of the second amplifier U2; a second end of the fifth resistor R5 is grounded; a common end formed by a first end of the sixth resistor R6 and a first end of the seventh resistor R7 is connected to a positive power supply end of the second amplifier U2; a second end of the seventh resistor R7 is grounded; a second end of the sixth resistor R6 is connected to an output end of the second amplifier U2; an output end of the second amplifier U2 is connected to an anode of the second diode D2; a cathode of the second diode D2 is connected to a collector of the triode Q1; a base of the triode Q1 serves as a receiving end for receiving a pull-up level signal; an emitter of the triode Q1 is grounded; and a common end formed by the cathode of the second diode D2 and the collector of the triode Q1 serves as the output end of the signal control module 103.

In the present embodiment, an average voltage signal, which is obtained by converting an average current signal, and a pull-up voltage signal which is recorded as a Vingood signal (2V by default) are superposed, and the superposed voltage signal is recorded as a final voltage signal. The formula V−Vingood=(1+R5/R6)*(R4/R2*2+R4/R3*Vls) may be used to calculate the final voltage signal, where V−Vingood represents the final voltage signal, and Vls represents the average voltage signal obtained by converting the average current signal. It should be noted that the final voltage signal sent to the CPLD 11 by the second diode D2 is the maximum value of the system, and the triode Q1 controls the pull-up voltage signal to be pulled up or down. When the input is normal (i.e., not exceeding an acceptable range of the entire apparatus), the pull-up voltage signal is at a low level, the triode Q1 is turned off, and the pull-up voltage signal is controlled by the pull-up level; when the input is anomalous (i.e., exceeding an acceptable range of the entire apparatus), the pull-up voltage signal is at a high level, the triode Q1 is turned on, and the pull-up voltage signal is pulled down.

It should be noted that, in the present embodiment, the number, types, models, and values of the third resistors R3, the fourth resistors R4, the fifth resistors R5, the sixth resistors R6, the seventh resistors R7, the second amplifiers U2, the second diodes D2 and the triodes Q1 are not limited, as long as the components may achieve the effect of controlling the pull-up or pull-down of a pull-up voltage signal according to the requirements of an implementation scenario, that is, the number of the components and the connection manner thereof are determined according to a practical implementation scenario.

As shown in FIG. 5, the signal control module 103 further includes a twelfth resistor R12. A first end of the twelfth resistor R12 is connected to the output end of the second amplifier U2, and a second end of the twelfth resistor R12 is connected to the anode of the second diode D2. The twelfth resistor R12 has a function of current limiting in the present embodiment, and is configured to prevent the damage to the second diode D2 when an excessive average current signal passes through the second diode D2. It should be noted that, in the present embodiment, the number, types, models, and resistance values of the twelfth resistor R12 are not limited, as long as the twelfth resistors R12 may achieve the effect of current limiting. The number of the twelfth resistors R12 and the connection manner thereof may be determined according to a practical implementation scenario.

As shown in FIG. 5, the signal control module 103 further includes a thirteenth resistor R13. A first end of the thirteenth resistor R13 serves as a receiving end for receiving the pull-up level signal, and a second end of the thirteenth resistor R13 is connected to the base of the triode Q1. The thirteenth resistor R13 has a function of current limiting in the present embodiment, and is configured to prevent the damage to the triode Q1 when an excessive average current signal passes through the triode Q1. It should be noted that, in the present embodiment, the number, types, models, and resistance values of the thirteenth resistors R13 are not limited, as long as the thirteenth resistors R13 may achieve the effect of current limiting. The number of the thirteenth resistors R13 and the connection manner thereof may be determined according to a practical implementation scenario.

Figure 6:
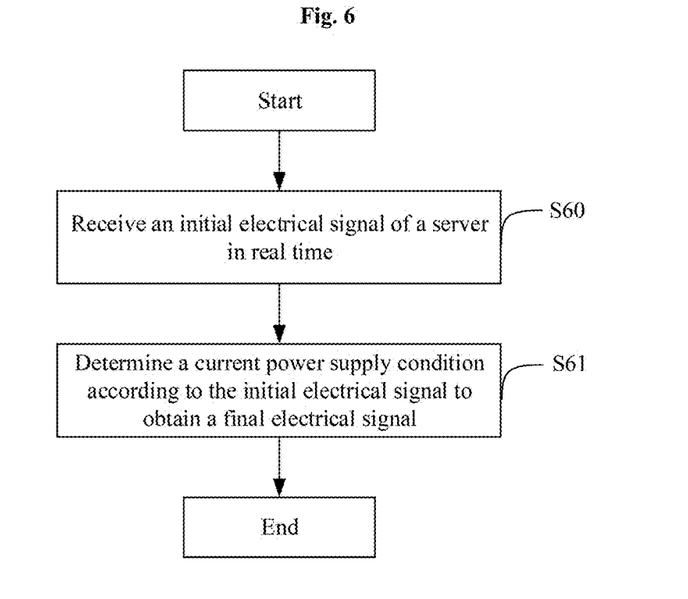
FIG. 6 is a flowchart of a method for adjusting power consumption performed by a PSU according to one or more embodiments of the present disclosure.

In order to solve the described technical problem, the embodiments of the present disclosure further provide a method for adjusting power consumption. FIG. 6 is a flowchart of a method for adjusting power consumption performed by a PSU according to one or more embodiments of the present disclosure. As shown in FIG. 6, the method is performed by a PSU and includes the following operations S60 and S61.

At operation S60, an initial electrical signal of the server is received in real time.

At operation S61, a current power supply condition is determined according to the initial electrical signal to obtain a final electrical signal.

The PSU needs to receive the final electrical signal, increase a power of the server when the final electrical signal is a signal representing that the current power supply condition is high output power, and decrease the power of the server when the final electrical signal is a signal representing that the current power supply condition is low output power.

In the system for adjusting power consumption, the present current signal is compared with the initial current signal, when the current signal is different from the initial current signal, a low-level "0" signal may be output; and when the present current signal is the same as the initial current signal, a high-level "1" signal may be output. It should be noted that, the high-level signal and low-level signal, which represent whether the present current signal is the same as the initial current signal, may be in the form of 2-bit data strings, such as "00" representing a low-level signal and "01" representing a low-level signal, or "11" representing a high-level signal and "10" representing a high-level signal; or may be in the form of 4-bit data strings, such as "0000" representing a low-level signal and "0001" representing a low-level signal, or "1111" representing a high-level signal and "1110" representing a high-level signal. In the present embodiment, there are no specific requirements on the format of the data strings representing the high and low level signals, or the number of digits in the data strings, and the implementation manner thereof may be determined according to a practical implementation scenario.

According to the method, the final voltage signal is acquired in real time without adding a PSU interface, and subsequent adjustment is performed by using a CPLD, thereby avoiding CPU frequency oscillation and PSU frequency oscillation caused by a time interval at which a BMC polls the PSU, and the case that in a low-frequency state, the functions of the server are restricted.

Figure 7:
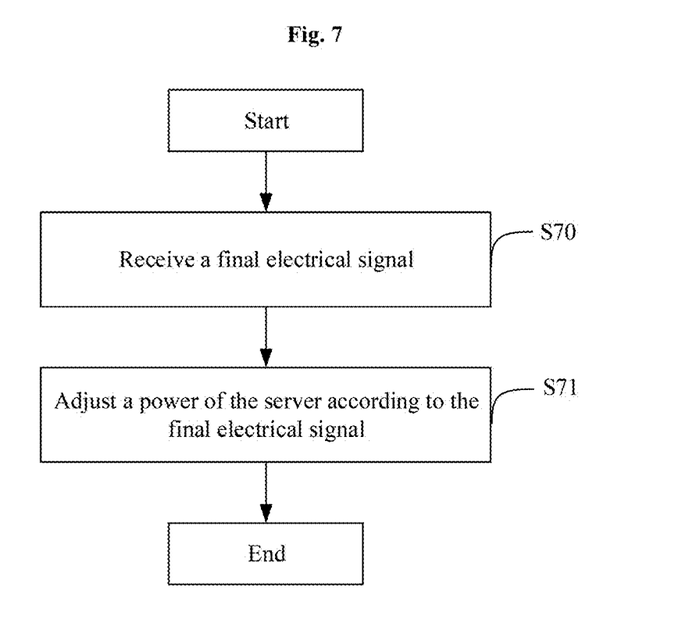
FIG. 7 is a flowchart of a method for adjusting power consumption performed by a CPLD according to one or more embodiments of the present disclosure.

In order to solve the described technical problem, the embodiments of the present disclosure further provide a method for adjusting power consumption. FIG. 7 is a flowchart of a method for adjusting power consumption performed by a CPLD according to one or more embodiments of the present disclosure. As shown in FIG. 7, the method is performed by a CPLD, and includes the following operations S70 and S71.

At operation S70, a final electrical signal is received.

The final electrical signal is obtained by converting an initial electrical signal received by a server in real time.

At operation S71, the power of the server is adjusted according to the final electrical signal.

A power of the server is increased when the final electrical signal is a signal representing that the current power supply condition is high output power, and the power of the server is decreased when the final electrical signal is a signal representing that the current power supply condition is low output power.

It should be noted that the final electrical signal is a voltage signal, and the final electrical signal may be in the form of 2-bit data strings, such as "00" representing a low-level signal and "01" representing a low-level signal, or "11" representing a high-level signal and "10" representing a high-level signal; or may be in the form of 4-bit data strings, such as "0000" representing a low-level signal and "0001" representing a low-level signal, or "1111" representing a high-level signal and "1110" representing a high-level signal. In the present embodiment, there are no specific requirements on the format of the data strings representing the high and low level signals, or the number of digits in the data strings, and the implementation manner thereof may be determined according to a practical implementation scenario.

It may be understood that, the working signal of the frequency modulation component 20 mentioned in the system for adjusting power consumption may be a high-level signal or a low-level signal. However, other control manners may also be used, for example, the high-level signal and the low-level signal may also be 4-bit, 8-bit, or 16-bit data strings, such as "0000", "001001", and "101110100001". In the present embodiment, there are no specific requirements on the format of the data strings representing the high and low level signals, or the number of digits in the data strings, and the implementation manner thereof may be determined according to a practical implementation scenario. In this way, the final voltage signal is acquired in real time without adding a PSU interface, and subsequent adjustment is performed by using a CPLD, thereby avoiding CPU frequency oscillation and PSU frequency oscillation caused by a time interval at which a BMC polls the PSU, and the case that in a low-frequency state, the functions of the server are restricted.

Figure 8:
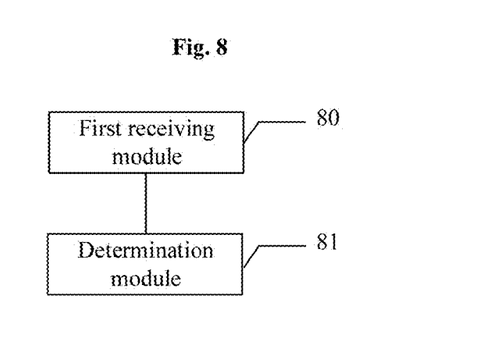
FIG. 8 is a structural diagram of an apparatus for adjusting power consumption provided in a PSU according to one or more embodiments of the present disclosure.

In the foregoing embodiment, the method for adjusting power consumption is described in detail. The embodiments of the present disclosure further provide an embodiment corresponding to the apparatus for adjusting power consumption provided in a PSU. FIG. 8 is a structural diagram of an apparatus for adjusting power consumption provided in a PSU according to one or more embodiments of the present disclosure. As shown in FIG. 8, the embodiments of the present disclosure further provide an apparatus for adjusting power consumption, the apparatus being provided in a PSU and includes:

a first receiving module 80, configured to receive an initial electrical signal from a server in real time;

a determination module 81, configured to determine a current power supply condition according to the initial electrical signal to obtain a final electrical signal, so that based on the final electrical signal, the power of the server is increased when the final electrical signal is a signal representing that the current power supply condition is high output power, and the power of the server is decreased when the final electrical signal is a signal representing that the current power supply condition is low output power.

Since the device embodiment corresponds to the method embodiment, details about the device embodiment may refer to the method embodiment, and thus are not described here.

Figure 9:
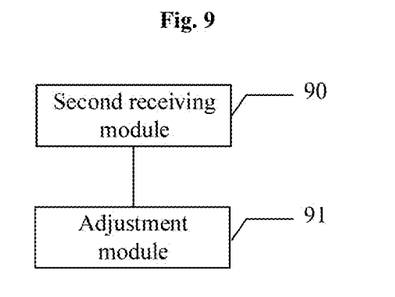
FIG. 9 is a structural diagram of an apparatus for adjusting power consumption provided in a CPLD according to one or more embodiments of the present disclosure.

In the foregoing embodiment, the method for adjusting power consumption is described in detail. The embodiments of the present disclosure further provide an embodiment corresponding to the apparatus for adjusting power consumption provided in a CPLD. FIG. 9 is a structural diagram of an apparatus for adjusting power consumption provided in a CPLD according to one or more embodiments of the present disclosure; As shown in FIG. 9, the embodiments of the present disclosure further provide an apparatus for adjusting power consumption, the apparatus being provided in a CPLD and includes:

a second receiving module 90, configured to receive a final electrical signal, wherein the final electrical signal is obtained by converting an initial electrical signal received by a server in real time;

an adjustment module 91, configured to adjust the power of the server according to the final electrical signal, the power of the server is increased when the final electrical signal is a signal representing that the current power supply condition is high output power, and the power of the server is decreased when the final electrical signal is a signal representing that the current power supply condition is low output power.

Since the device embodiment corresponds to the method embodiment, details about the device embodiment may refer to the method embodiment, and thus are not described here.

Figure 10:
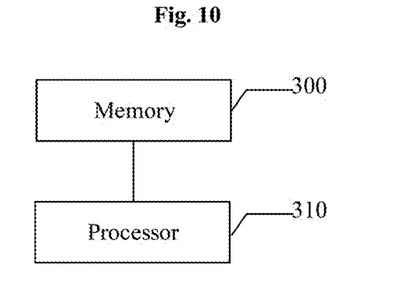
FIG. 10 is a structural diagram of a device for adjusting power consumption according to one or more embodiments of the present disclosure.

FIG. 10 is a structural diagram of a device for adjusting power consumption according to one or more embodiments of the present disclosure. As shown in FIG. 10, the device for adjusting power consumption includes:

a memory 300, configured to store a computer readable instruction;

one or more processors 310, configured to implement the operations of the method for adjusting power consumption mentioned in the foregoing embodiments when the computer readable instructions are executed.

The device for adjusting power consumption according to the present embodiment may include but is not limited to a smart phone, a tablet computer, a notebook computer, a desktop computer, etc.

The processor 310 may include one or more processing cores, such as a 4-core processor and an 8-core processor. The processor 310 may be implemented in at least one hardware form of Digital Signal Processing (DSP), Field-Programmable Gate Array (FPGA), or Programmable Logic Array (PLA). The processor 310 may also include a main processor and a coprocessor, wherein the main processor is a processor for processing data in a wake-up state, and is also referred to as a CPU; and the coprocessor is a low power consumption processor for processing data in a standby state. In some embodiments, the processor 310 may be integrated with a Graphics Processing Unit (GPU), and the GPU is responsible for rendering and drawing content required to be displayed on the display screen. In some embodiments, the processor 310 may also include an Artificial Intelligence (AI) processor for processing computational operations related to machine learning.

The memory 300 may include one or more computer-readable storage media, which may be non-transitory. The memory 300 may also include a high-speed random access memory, and a non-volatile memory, such as one or more magnetic disk storage devices, flash memory storage devices. In the present embodiment, the memory 300 is at least configured to store the following computer readable instructions, wherein after the computer readable instructions are loaded and executed by the processor 310, the operations related to the method for adjusting power consumption disclosed in any one of the foregoing embodiments may be implemented. In addition, resources stored in the memory 300 may further include an operating system and data, and the storage manner may be temporary storage or permanent storage. The operating system may include Windows, Unix, Linux, and the like. The data may include, but is not limited to, a method for adjusting power consumption, and the like.

In some embodiments, the device for adjusting power consumption may also include a display screen, an input/output interface, a communication interface, a power supply, and a communication bus.

A person having ordinary skill in the art may understand that the structure shown in FIG. 10 does not limit the device for adjusting power consumption, and may include more or less components than those shown in the figure.

The device for adjusting power consumption according to the embodiments of the present disclosure includes a memory 300 and a processor 310, and when executing the programs stored in the memory 300, the processor 310 may implement the method for adjusting power consumption.

Finally, the embodiments of the present disclosure further provide an embodiment corresponding to one or more non-transitory computer readable storage mediums storing computer readable instructions. The computer readable storage medium stores a computer readable instruction. The computer readable instruction, when executed by the processor, implements the operations described in the foregoing method embodiments (which may be the method performed by the PSU, or the method performed by the CPLD, or the method performed by the PSU and the CPLD).

It should be understood that, when the method in the foregoing embodiment is implemented in the form of a software functional unit and is sold or used as an independent product, the integrated unit may be stored in a computer-readable storage medium. Based on such understanding, the part of the technical solution of the present disclosure that contributes in essence or to the prior art or all or part of the technical solution may be embodied in the form of a software product stored in a storage medium, to execute all or some of the operations of the methods of various embodiments of the present disclosure. The storage medium above includes: any medium that may store program codes, such as a USB flash disk, a removable hard disk, a read-only memory (ROM), a random access memory (RAM), a magnetic disk, or an optical disk.

The foregoing describes in detail the system, method, apparatus and device for adjusting power consumption, and the medium according to the present disclosure. The embodiments in this description are described in a progressive manner. Each embodiment focuses on differences from other embodiments. For the same similar parts among the embodiments, reference may be made to each other. For the apparatus disclosed in the embodiment, as the apparatus corresponds to the method disclosed in the embodiment, the illustration thereof is relatively simple, and for the relevant parts, reference may be made to the illustration of the method part. It should be noted that for a person having ordinary skill in the present technical field, several improvements and modifications may also be made to the present disclosure without departing from the principle of the present disclosure, and these improvements and modifications shall fall within the scope of protection of the claims of the present disclosure.

It should be noted that in this description, relational terms such as first and second are only used to distinguish one entity or operation from another entity or operation do not require or imply any actual relationship or sequence between these entities or operations. Furthermore, terms such as "including", "including" or any other variants are intended to cover the non-exclusive including, thereby making that the process, method, merchandise, or device including a series of elements include not only those elements but also other elements that are not listed explicitly or the inherent elements to the process, method, merchandise, or device. Without further limitation, an element defined by a sentence "include a . . . " does not exclude other same elements existing in a process, a method, an article, or a device that includes the element.

What is claimed is:

1. A system for adjusting power consumption, comprising a Power Supply Unit (PSU) and a Complex Programmable Logic Device (CPLD);
   wherein an input end of the PSU is connected to a server, and the PSU is configured to receive an initial electrical signal of the server in real time, and determine a current power supply condition according to the initial electrical signal to obtain a final electrical signal; and
   the CPLD is connected to an output end of the PSU, and the CPLD is configured to receive the final electrical signal, increase a power of the server when the final electrical signal is a signal representing that the current power supply condition is high output power, and decrease the power of the server when the final electrical signal is a signal representing that the current power supply condition is low output power.

2. The system for adjusting power consumption according to claim 1, wherein the PSU comprises a sampling module, an average current output module and a signal control module;
   wherein an input end of the sampling module serves as the input end of the PSU and is connected to the server, and the sampling module is configured to acquire the initial electrical signal and a present current signal;
   an input end of the average current output module is connected to an output end of the sampling module, and the average current output module is configured to receive the initial electrical signal of the server and output an average current signal according to the initial electrical signal and the present current signal; and
   an input end of the signal control module is connected to an output end of the average current output module, and the signal control module is configured to determine the current power supply condition according to the average current signal, so as to obtain the final electrical signal; and an output end of the signal control module serves as the output end of the PSU and is connected to the CPLD.

3. The system for adjusting power consumption according to claim 2, wherein the average current output module comprises a first amplifier and a first diode;
   wherein a non-inverting input end of the first amplifier serves as the input end of the PSU, an inverting input end of the first amplifier is grounded, an output end of the first amplifier is connected to an anode of the first diode, and a cathode of the first diode serves as the output end of the average current output module.

4. The system for adjusting power consumption according to claim 2, wherein the sampling module comprises a first resistor and a second resistor;
   wherein a common end formed by a first end of the first resistor and a first end of the second resistor serves as the input end of the sampling module, the first end of the first resistor is connected to the first end of the second resistor, a second end of the second resistor is grounded, and a second end of the first resistor serves as the output end of the sampling module.

5. The system for adjusting power consumption according to claim 2, wherein the signal control module comprises an adder, a second amplifier, a second diode and a triode;
   wherein the adder comprises a third resistor, a fourth resistor, a fifth resistor, a sixth resistor and a seventh resistor;
   a first end of the third resistor serves as a first input end of the signal control module, and a first end of the fourth resistor serves as a second input end of the signal control module; and
   a common end formed by a second end of the third resistor, a second end of the fourth resistor and a first end of the fifth resistor is connected to a negative power supply end of the second amplifier; a second end of the fifth resistor is grounded; a common end formed by a first end of the sixth resistor and a first end of the seventh resistor is connected to a positive power supply end of the second amplifier; a second end of the seventh resistor is grounded; a second end of the sixth resistor is connected to an output end of the second amplifier; an output end of the second amplifier is connected to an anode of the second diode; a cathode of the second diode is connected to a collector of the triode; a base of the triode serves as a receiving end for receiving a pull-up level signal; an emitter of the triode is grounded; and a common end formed by the cathode of the second diode and the collector of the triode serves as the output end of the signal control module.

6. The system for adjusting power consumption according to claim 1, further comprising a frequency modulation component;

the frequency modulation component is connected to the CPLD and is configured to adjust the power of the server.

7. The system for adjusting power consumption according to claim 1, wherein the final electrical signal is an output power signal representing the current power supply condition; or, the initial electrical signal is a current signal which is obtained by converting a voltage signal of the server; or, the present current signal is a current signal generated by the PSU.

8. The system for adjusting power consumption according to claim 3, wherein the average current output module further comprises an eighth resistor, wherein a first end of the eighth resistor is connected to the output end of the first amplifier, a second end of the eighth resistor is connected to the anode of the first diode, and the eighth resistor is configured to prevent damage to the first diode when an excessive average current signal passes through the first diode.

9. The system for adjusting power consumption according to claim 3, wherein the average current output module further comprises a ninth resistor, a tenth resistor, an eleventh resistor, a first capacitor and a second capacitor, wherein a first end of the ninth resistor is connected to the non-inverting input end of the first amplifier; a second end of the ninth resistor is grounded; a first end of the tenth resistor is connected to the inverting input end of the first amplifier; a second end of the tenth resistor is grounded; a first end of the first capacitor is connected to the non-inverting input end of the first amplifier; a second end of the first capacitor is grounded; a first end of the eleventh resistor is connected to the inverting input end of the first amplifier; a second end of the eleventh resistor is connected to the cathode of the first diode; a first end of the second capacitor is connected to the inverting input end of the first amplifier; and a second end of the second capacitor is connected to the cathode of the first diode.

10. The system for adjusting power consumption according to claim 5, wherein the final voltage signal is calculated by using formula V-Vingood=(1+R5/R6)*(R4/R2*2+R4/R3*Vls), wherein V-Vingood represents the final voltage signal, Vls represents an average voltage signal obtained by converting the average current signal, and R2, R3, R4, R5 and R6 respectively represent resistor values of the second resistor, the third resistor, the fourth resistor, the fifth resistor and the sixth resistor.

11. The system for adjusting power consumption according to claim 5, wherein the signal control module further comprises a twelfth resistor, wherein a first end of the twelfth resistor is connected to the output end of the second amplifier, a second end of the twelfth resistor is connected to the anode of the second diode, and the twelfth resistor is configured to prevent damage to the second diode when an excessive average current signal passes through the second diode.

12. The system for adjusting power consumption according to claim 5, wherein the signal control module further comprises a thirteenth resistor, wherein a first end of the thirteenth resistor serves as a receiving end for receiving the pull-up level signal, a second end of the thirteenth resistor is connected to the base of the triode, and the thirteenth resistor is configured to prevent damage to the triode when an excessive average current signal passes through the triode.

13. The system for adjusting power consumption according to claim 2, wherein the average current output module is configured to determine whether the present current signal is consistent with the initial current signal; when the present current signal is inconsistent with the initial current signal, determine an average value of the present current signal and the initial current signal so as to obtain the average current signal, and convert the average current signal into a corresponding average voltage signal according to a conversion relationship.

14. The system for adjusting power consumption according to claim 13, wherein the signal control module is further configured to superimpose the average voltage signal and a pull-up voltage signal to obtain a final voltage signal, and transmit the final voltage signal to the CPLD.

15. A method for adjusting power consumption, wherein the method is performed by a Power Supply Unit (PSU) and comprises:

receiving an initial electrical signal from a server in real time;

determining a current power supply condition according to the initial electrical signal to obtain a final electrical signal, so that based on the final electrical signal, the power of the server is increased when the final electrical signal is a signal representing that the current power supply condition is high output power, and the power of the server is decreased when the final electrical signal is a signal representing that the current power supply condition is low output power.

16. A method for adjusting power consumption, wherein the method is performed by a Complex Programmable Logic Device (CPLD) and comprises:

receiving a final electrical signal, wherein the final electrical signal is obtained by converting an initial electrical signal received by a server in real time; and adjusting a power of the server according to the final electrical signal, so that the power of the server is increased when the final electrical signal is a signal representing that a current power supply condition is high output power, and the power of the server is decreased when the final electrical signal is a signal representing that the current power supply condition is low output power.

* * * * *